United States Patent
Park

(10) Patent No.: US 11,485,658 B2
(45) Date of Patent: Nov. 1, 2022

(54) WATER TREATMENT APPARATUS INCLUDING UNDERWATER PLASMA DISCHARGE MODULE

(71) Applicant: DOOSAN ENERBILITY CO., LTD., Changwon-si (KR)

(72) Inventor: Yong Hae Park, Busan (KR)

(*) Notice: Subject to any disclaimer, the term of this patent is extended or adjusted under 35 U.S.C. 154(b) by 286 days.

(21) Appl. No.: 16/798,289

(22) Filed: Feb. 21, 2020

(65) Prior Publication Data
US 2020/0339460 A1    Oct. 29, 2020

(30) Foreign Application Priority Data

Apr. 26, 2019  (KR) .................. 10-2019-0049188

(51) Int. Cl.
| | |
|---|---|
| C02F 9/00 | (2006.01) |
| C02F 1/00 | (2006.01) |
| C02F 1/46 | (2006.01) |
| C02F 101/30 | (2006.01) |
| C02F 1/24 | (2006.01) |

(52) U.S. Cl.
CPC .............. *C02F 9/00* (2013.01); *C02F 1/008* (2013.01); *C02F 1/004* (2013.01); *C02F 1/24* (2013.01); *C02F 1/4608* (2013.01); *C02F 2101/30* (2013.01); *C02F 2303/04* (2013.01); *C02F 2305/023* (2013.01)

(58) Field of Classification Search
None
See application file for complete search history.

(56) References Cited

U.S. PATENT DOCUMENTS

| | | | |
|---|---|---|---|
| 7,704,390 B2 | 4/2010 | Leffler et al. | |
| 2004/0099607 A1* | 5/2004 | Leffler | C02F 1/4672 |
| | | | 210/764 |
| 2007/0154650 A1* | 7/2007 | Wu | H05H 1/2406 |
| | | | 427/532 |

FOREIGN PATENT DOCUMENTS

| | | |
|---|---|---|
| JP | 04-244291 A | 9/1992 |
| KR | 1019990009569 A | 2/1999 |
| KR | 100766218 B1 | 10/2007 |
| KR | 2009-26114 A | 10/2009 |
| KR | 1156125 B1 | 6/2012 |
| KR | 10-1206905 B1 | 11/2012 |
| KR | 20130028422 A | 3/2013 |
| KR | 20140130956 A | 11/2014 |
| KR | 101563401 B1 | 10/2015 |
| KR | 101610599 B1 | 4/2016 |

(Continued)

*Primary Examiner* — Richard C Gurtowski
(74) *Attorney, Agent, or Firm* — Harvest IP Law, LLP

(57) ABSTRACT

A water treatment apparatus including an underwater plasma discharge module is provided. The water treatment apparatus includes a dissolved air flotation device configured to remove foreign matter contained in water and an underwater plasma discharge module disposed at a preceding stage of the dissolved air flotation device and configured to cause a portion of the water to be introduced into the dissolved air flotation device to perform underwater plasma discharging, wherein the dissolved air flotation device comprises a mixing and coagulation basin configured to coagulate or flocculate the foreign matter contained in the water to form and grow flocs of the foreign matter, and a flotation basin configured to raise and remove the flocs by supplying microbubbles to the water passing through the mixing and coagulation basin.

19 Claims, 6 Drawing Sheets

(56) References Cited

FOREIGN PATENT DOCUMENTS

| KR | 20170141411 A | 12/2017 |
| KR | 20190008164 A | 1/2019 |
| KR | 20190042250 A | 4/2019 |

* cited by examiner

WATER TREATMENT APPARATUS INCLUDING UNDERWATER PLASMA DISCHARGE MODULE

CROSS REFERENCE TO RELATED APPLICATION

This application claims priority to Korean Patent Application No. 10-2019-0049188, filed on Apr. 26, 2019, the disclosures of which are incorporated herein by reference in their entireties.

BACKGROUND

1. Field

Apparatuses and methods consistent with exemplary embodiments relate to a water treatment apparatus including an underwater plasma discharge module and, more particularly, to a water treatment apparatus including an underwater plasma discharge module applied to a dissolved air flotation apparatus that raises foreign matter to a surface of water to be treated and removes the floating foreign matter by supplying air to the water to be treated.

2. Description of the Related Art

Water shortages are increasing due to increase in population, growing demand for water to meet improved living standards, and uneven geographical and seasonal distribution of rainfall under the influence of an erratic climate. About 40% of the world's population suffers from drinking water shortages at present and the water shortages are expected to increase due to pollution of surface and ground water.

Therefore, various methods for desalination of seawater have been developed, such as evaporation using a heat source, osmosis including forward osmosis and reverse osmosis, electrodialysis, crystallization, ion exchange membrane filtration, solvent extraction, and pressure adsorption. Among these methods, multi-stage flash (MSF), multi-effect distillation (MED), and reverse osmosis (RO) are most widely used for desalination of seawater. In order to improve desalination efficiency, various methods have been attempted to preliminarily remove impurities such as suspended solids in seawater before the seawater is fed to a seawater desalination process.

Suspended solids (SS) generally refer to small particles of 0.1 μm or more contained in water. When suspended solids in water are present in a large amount, they cause severe turbidity and increase biochemical oxygen demand (BOD) and chemical oxygen demand (COD). Sewage containing a large volume of suspended solids is a contaminant that must be treated because it will accumulate in a pipeline and obstruct the flow of water. In addition, organic substances in sewage are deposited in a pipeline and decay over time, thereby worsening water quality.

Suspended solids may be classified as matter that is in between colloidal components and dissolved substances in terms of particle size. Suspended solids are slightly larger than colloidal components in size. On the other hand, they are distinguished from dissolved substances in that they are suspended in water. The suspended solids settle to the bottom in a basin to some extent over a certain period of time. However, a settling rate is very slow because the particle sizes of the suspended solids are very small. For this reason, a coagulation/flocculation process is used to expedite removal of suspended solids contained in water. That is, a coagulant and/or flocculant is added to water to be treated for coagulation and/or flocculation of suspended solids so that flocs of suspended solids can easily settle to the bottom and can be removed in a short time.

To this end, a water treat apparatus including a mixing basin, a coagulation basin, and a flotation basin is used.

The mixing basin rapidly mixes chemicals and water to be treated to primary aggregate suspended matter and transfers the mixture to the coagulation basin. The coagulation basin flocculates the primarily aggregated suspended matter to become larger flocs and transfers the resulting water containing the flocs to the flotation basin. The flotation basin supplies air that raises the flocs to the surface of the water to be treated so that the floating flocs can be removed through skimming. That is, fine bubbles are attached to the suspended matter (i.e., suspended phase) contained in a dispersion medium by physical action so that the suspended matter is raised to a limit surface in which the dispersion medium and air contact. In this way, solid-liquid separation is expedited.

There are various flotation types classified by an air-bubble generation method: dissolved air flotation (DAF); dispersed or cavitation air flotation (DaF); induced air flotation (IAF); vacuum flotation; electro flotation; microbiological auto flotation, etc.

The dissolved air flotation (DAF) refers to a water treatment process through solid and liquid separation. For example, air is sufficiently dissolved in water under pressure and the air-dissolved water is injected into water to be treated. The oversaturated air in the water forms fine bubbles due to reduced pressure, and the fine bubbles are attached to flocs in the water to be treated. The bubble-floc combinations rapidly rise to the surface of the water to undergo solid-liquid separation.

In dissolved air flotation devices, a chemical coagulant such as NaOCl, acid (e.g., sulfuric acid), or $FeCl_3$ is usually used to expedite coagulation of colloidal components in water. However, there is a problem in that the chemical used in this process must be removed in any subsequent process. This results in an increase in the cost for water treatment.

Therefore, development of a process that can efficiently form flocs while reducing the dose of a coagulant and flocculant is required.

SUMMARY

Aspects of one or more exemplary embodiments provide a water treatment apparatus including an underwater plasma discharge module applied to a dissolved air flotation device that floats and removes impurities contained in water to be treated by supplying air to the water. The apparatus is capable of improving water treatment efficiency by decomposing microorganisms, organic substances, and suspended solids contained in water to be treated, using underwater discharge plasma generated by the underwater plasma discharge module.

Additional aspects will be apparent in part in the description which follows and, in part, will become apparent from the description from the following description, or may be learned by practice of the exemplary embodiments.

According to an aspect of an exemplary embodiment, there is provided a water treatment apparatus including: a dissolved air flotation device configured to remove foreign matter contained in water; and an underwater plasma discharge module disposed at a preceding stage of the dissolved air flotation device and configured to cause a portion of water to be introduced into the dissolved air flotation device to perform underwater plasma discharging. The dissolved air flotation device may include a mixing and coagulation basin configured to coagulate/flocculate the foreign matter to form and grow flocs of the foreign matter and a flotation basin configured to raise and remove the flocs by supplying microbubbles to the water passing through the mixing and coagulation basin The mixing and coagulation basin may include a measuring unit configured to measure a concentration of the foreign matter contained in the water and a controller configured to control an operation of the underwater plasma discharge module according to a measurement value output from the measuring unit.

The flotation basin may include an air injector configured to raise the flocs contained in the water passing through the mixing and coagulation basin and a floc remover configured to remove the floating flocs floating on the water.

The flotation basin may further include a filter configured to filter out the foreign matter remaining in the water passing through the floc remover.

The underwater plasma discharge module may include: a reactor including an input port through which the water flows in and an output port through which purified water flows out; a ground electrode located in a first side of the reactor; and a plasma electrode module located in a second side of the reactor and configured to generate plasma.

The input port and the output port of the reactor and the ground electrode may be disposed at a same side, and the ground electrode and the plasma electrode module may be disposed to face each other.

The reactor may further include a gap adjuster configured to adjust a gap between the ground electrode and the plasma electrode module.

The plasma electrode module may include: a conductive substrate including a plurality of holes; a ceramic layer surrounding a surface of the conductive substrate except for a surface in each of the holes; and plasma electrodes disposed in respective holes, each plasma electrode having a multilayer structure including a ground portion having a columnar shape, a fixed portion, and a discharge portion which are sequentially stacked. The ground portion may be in contact with the conductive substrate, and plasma may be generated on the discharge portion.

The ground portion, the fixed portion, and the discharge portion may be integrally formed as a one-piece body and may be made of a same material having corrosion resistance.

The conductive substrate may have a plate shape or a columnar shape.

According to an aspect of another exemplary embodiment, there is provided a water treatment apparatus including: a dissolved air flotation device configured to remove foreign matter contained in water; and an underwater plasma discharge module disposed at a subsequent stage of the dissolved air flotation device and configured to cause a portion of water discharged from the dissolved air flotation device to perform underwater plasma discharging. The dissolved air flotation device may include a mixing and coagulation basin configured to coagulate or flocculate the foreign matter contained in the water to form and grow flocs of the foreign matter and a flotation basin configured to raise and remove the flocs by supplying microbubbles to the water passing through the mixing and coagulation basin.

Microbubbles may be supplied into a portion of purified water resulting from the underwater plasma discharging performed by the underwater plasma discharge module, and the purified water in which the microbubbles are contained is used as a microbubble source for the flotation basin.

The mixing and coagulation basin may include a measuring unit configured to measure a concentration of the foreign matter contained in the water and a controller configured to control an operation of the underwater plasma discharge module according to a measurement value output from the measuring unit.

The flotation basin may include an air injector configured to raise the flocs to a surface of the water passing through the mixing and coagulation basin and a floc remover configured to remove the flocs floating on the surface of the water.

The flotation basin may further include a filter configured to filter out the foreign matter remaining in the water passing through the floc remover.

The underwater plasma discharge module may include: a reactor including an input port through which the water flows in and an output port through which purified water flows out; a ground electrode located in a first side of the reactor; and a plasma electrode module located in a second side of the reactor and configured to generate plasma.

The input port and the output port of the reactor and the ground electrode may be disposed at a same side, and the ground electrode and the plasma electrode module may be disposed to face each other.

The reactor may include a gap adjuster configured to adjust a gap between the ground electrode and the plasma electrode module.

The plasma electrode module may include: a conductive substrate including a plurality of holes; a ceramic layer surrounding a surface of the conductive substrate except for a surface in each of the holes; and a plurality of plasma electrodes, each plasma electrode having a multilayer structure including a ground portion having a columnar shape, a fixed portion, and a discharge portion which are sequentially stacked, wherein the ground portion is may be contact with the conductive substrate and the discharge portion may generate plasma.

The ground portion, the fixed portion, and the discharging portion may be made of a same material having corrosion resistance and may be integrally formed as a one-piece body.

According to one or more exemplary embodiments, the water treatment apparatus including the underwater plasma discharge module may decompose impurities such as microorganisms, organic substances, and suspended solids contained in water to be treated by plasma generated by the underwater plasma discharge module, resulting in improvement in water treatment efficiency.

In addition, because the underwater plasma discharge module is applied to the dissolved air flotation device, the flocculation efficiency is improved due to microbubbles generated by the underwater plasma discharge module.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
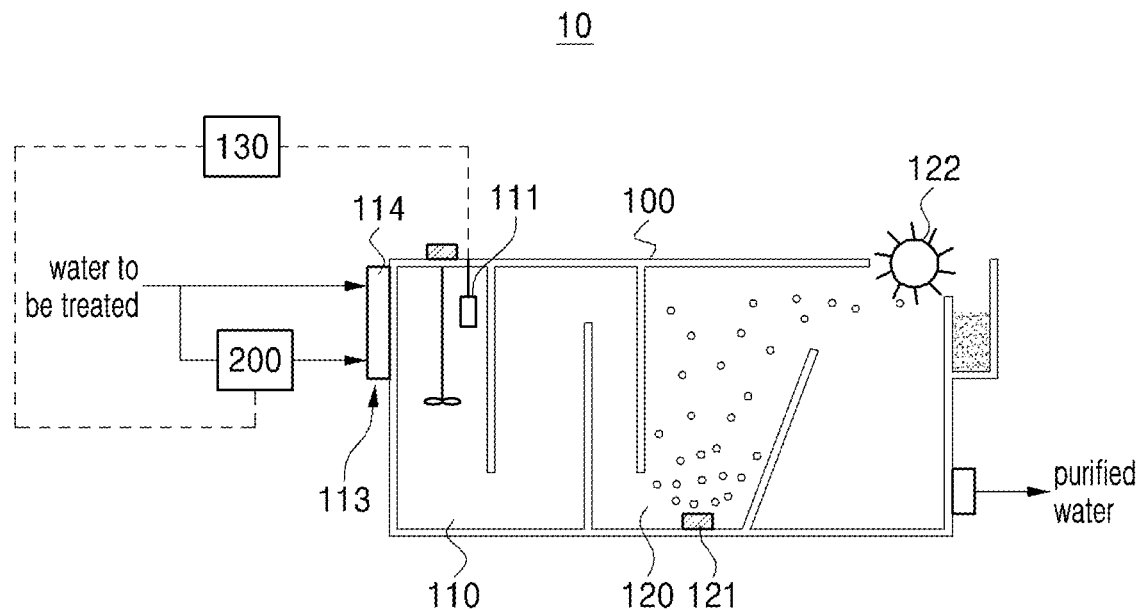
FIGS. 1 and 2 are schematic views illustrating a water treatment apparatus according to an exemplary embodiment.

Various modifications may be made to the embodiments of the disclosure, and there may be various types of embodiments. Thus, specific embodiments will be illustrated in drawings, and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. In this specification, the terms such as "comprises", "includes" and/or "have/has" should be construed as designating that there are such features, regions, integers, steps, operations, elements, components, and/or a combination thereof in the specification, not to exclude the presence or possibility of adding of one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

It will be understood that, although the identification symbols may be used herein to describe various steps, the terms are used only for distinguishing one element step from another step, and the essence, sequence, or order of the steps are not limited by the terms. Therefore, unless explicitly stated for the order of each step, the steps may be performed in a different order from the order in which the steps are described or termed. That is, each of the steps may be performed in the same order as described herein, or substantially simultaneously, or in reverse order.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

Hereinbelow, exemplary embodiments will be described with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
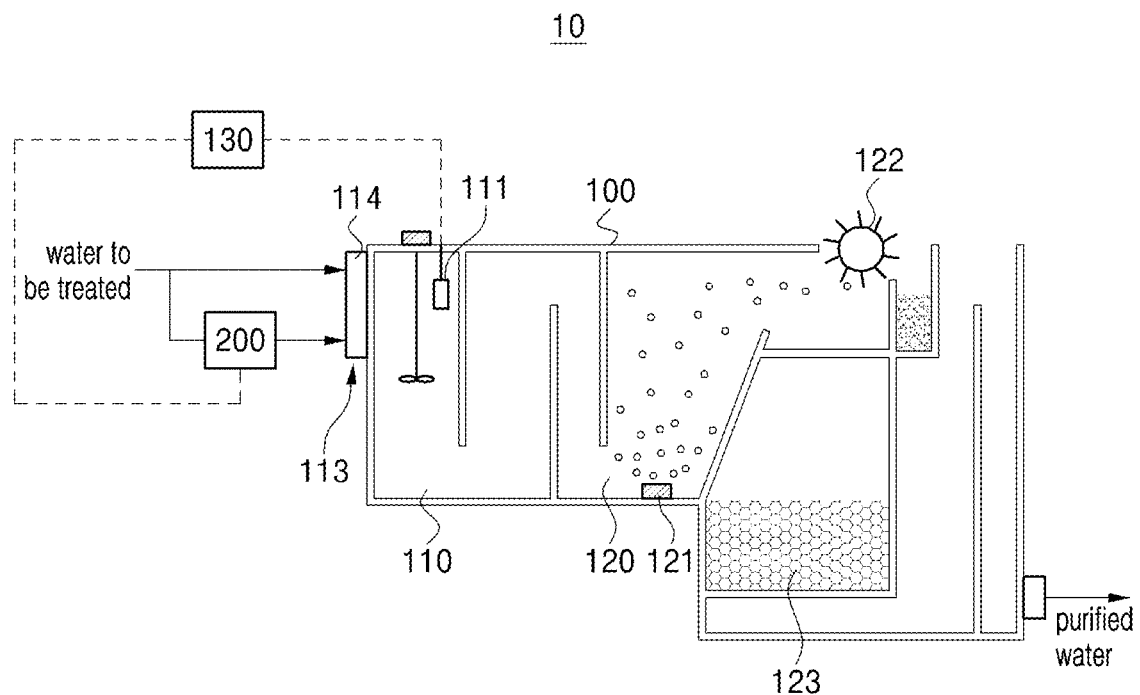

FIGS. 1 and 2 are conceptual views schematically illustrating a water treatment apparatus 10 according to an exemplary embodiment. Referring to FIGS. 1 and 2, the water treatment apparatus 10 may include a dissolved air flotation device 100 that removes foreign matter contained in water to be treated and an underwater plasma discharge module 200 that is installed at a preceding stage of the dissolved air flotation device 100 and causes a portion of the water to be treated, which is to be fed to the dissolved air flotation device 100, to undergo underwater plasma discharging.

The dissolved air flotation device 100 may include a mixing and coagulation basin 110 and a flotation basin 120. In the mixing and coagulation basin 110, foreign matter contained in water to be treated is coagulated and flocculated to form and grow flocs of the foreign matter. In the flotation basin 120, microbubbles are supplied to the water fed from the mixing and coagulation basin 110 to raise the flocs to a surface of the water, and the flocs floating on the surface of the water are removed. When the water to be treated passes through the dissolved air flotation device 100, suspended solids and organic substances contained in the water to be treated are removed in a form of flocs.

For example, chemicals for coagulation and flocculation are used to easily form flocs of the foreign matter in the mixing and coagulation basin 110. The dose of the chemicals increases with the concentration of the foreign matter contained in the water to be treated. The chemicals used in the mixing and coagulation basin 110 must be removed before the water is introduced into the subsequent process or is discharged to a river or sea. Therefore, removing the chemicals incurs a cost.

According to an exemplary embodiment, coagulation/flocculation efficiency is improved by generating underwater discharge plasma in a portion of the water to be introduced into the dissolved air flotation device 100. Therefore, an amount of chemicals used for coagulation/flocculation in the mixing and coagulation basin 110 is reduced, resulting in reduction in the cost for removing the chemicals after the coagulation/flocculation process.

For example, due to OH radicals, oxidants, and microbubbles generated by subjecting a portion of the water to be treated to underwater plasma discharging, organic substances contained in the water to be treated are easily decomposed and removed, and cells of microorganisms are easily destroyed. Therefore, foreign matter such as organic substances and microorganisms can be easily removed.

In general, when a chemical for coagulation/flocculation is used, microorganisms and organic substances present in water to be treated interfere with formation of flocs. However, if underwater plasma discharging is performed, microorganisms and organic substances, which are factors to inhibit formation of flocs, are easily decomposed or removed. Therefore, floc formation efficiency improves. In addition, because the debris of organic substances or microorganisms thus decomposed plays a role of agglomeration nucleus in the mixing and coagulation basin 110, foreign matter contained in the water to be treated can be easily agglomerated. This also contributes to improvement in the floc formation efficiency.

Therefore, by feeding the water having undergone the underwater plasma discharging to the mixing and coagulation basin 110, the same or similar coagulation/flocculation efficiency and foreign matter removal efficiency to that of a case in which an existing chemical coagulant/flocculant is used can be obtained, without using the chemical coagulant/flocculant. Therefore, the dose of chemicals used is reduced and thus the cost of the subsequent process for removing the chemical coagulant/flocculant is reduced.

The dissolved air flotation device 100 of the water treatment apparatus 10 includes the mixing and coagulation basin 110 and the flotation basin 120. The mixing and coagulation basin 110 and the flotation basin 120 are partitioned from each other by one or more bather walls and are configured to communicate with each other through upper end portions and/or lower end portions of the bather walls. When the water moves from the mixing and coagulation basin 110 to the flotation basin 120 along a flow path defined by the bather walls, the foreign matter contained in the water is removed.

An inlet 113 through which feed water (i.e., water to be treated) is introduced into the mixing and coagulation basin 110 may be filled with a mixing inducer 114 that causes resistance to the flow of the feed water passing through the inlet 113. The mixing inducer 114 causes collisions of particles, vortices, and turbulence in the flow of the feed water and causes frequent changes in the flow trajectory of the feed water. The resulting turbulent flow enables the particles contained in the feed water to come into contact with each other without using an additional power source so that the particles can be agglomerated to form flocs having a predetermined size or more. The flocs formed as described above are grown by an agitator provided in the mixing and coagulation basin 110.

In detail, because the inlet 113 through which feed water flows is filled with the mixing inducer 1140, the vortex flow or the turbulent flow of the feed water is generated by the mixing inducer 114 while the feed water passes through the inlet 113. The vortex flow or the turbulent flow enables foreign matter contained in the feed water to be aggressively mixed and agitated. Therefore, microparticles and organic substances (i.e., foreign matter) contained in the feed water are easily brought into contact with each other, thereby easily forming flocs.

The mixing inducer 114 may be a mesh member or a fiber bundle. Preferably, the mesh member may be composed of multiple mesh plates stacked on each other, and the fiber bundle may be composed of multiple fibers intertwined or tangled.

For example, the multiple mesh plates of the mesh member may be stacked in such a manner that mesh holes of each mesh plate are mis-aligned with corresponding mesh holes of an adjacent mesh plate. Due to the arrangement in which the mesh plates are stacked in a mis-aligned manner, the feed water forms a vortex or turbulent flow while flowing down through the mesh member due to gravity. In addition, because the arrangement provides meandering flow paths, contact time and contact area between the feed water and chemicals used increase and thus formation of flocs increases. These flocs are raised to the surface of the water by bubbles in the following basin (i.e., the flotation basin 120) and removed. Therefore, the removal efficiency of foreign matter contained in feed water is considerably improved.

In addition, it is possible to control the intensity of turbulence and/or vortex by appropriately selecting a size of the mesh holes. Therefore, it is possible to control a flow rate of feed water to be treated by the water treatment apparatus according to a state of the feed water. For example, if a concentration of foreign matter in the feed water is low, the contact area between the coagulant/flocculant and the water to be treated is reduced by increasing the size of the mesh holes and reducing the number of mesh plates stacked to constitute the mesh member. On the contrary, if the concentration of foreign matter is high, the amount and size of the generated flocs can be adjusted by increasing the contact area and time between the coagulant/flocculant and the water to be treated.

The flocs formed in the water due to the turbulence and/or vortex caused by the mixing inductor 114 may be grown by using a mechanical mixer (e.g., agitator).

The mixing and coagulation basin 110 may be equipped with a measuring unit 111 that measures the concentration of the foreign matter contained in the water to be treated. The mixing and coagulation basin 110 may include a controller 130 that controls an operation of the underwater plasma discharge module 200 according to the measurements output from the measuring unit 111.

For example, if the measuring unit 110 measures the concentration of foreign matter (i.e., suspended solids, organic substances, and the like) contained in the water to be treated, and determines that the concentration is low to the extent that the suspended solids, the organic substances, and the like can be coagulated, flocculated, and removed only with the mixing inducer 114, and the underwater plasma discharge module 200 is not operated. On the other hand, if the measuring unit 110 determines that the quality of the untreated water is bad to the extent that the value of biochemical oxygen demand (BOD), the value of chemical oxygen demand (COD), or the value of suspended solids (SS) in the water is higher than a predetermined reference value, the underwater plasma discharge module 200 is operated and a density of the plasma and an operation time of the underwater plasma discharge module 200 are adjusted by the controller 130.

In the flotation basin 120, microbubbles are injected into the water passing through the mixing and coagulation basin 110 to raise the flocs to the surface of the water, and the floating flocs are removed. The flotation basin 120 may include an air injector 121 configured to raise the flocs to the surface of the water passing through the mixing and coagulation basin 110 and a floc remover 122 configured to remove the floating flocs. The flotation basin 120 may include a filter 123 that filters out a remaining foreign matter contained in the water after removal of the flocs as shown in FIG. 2.

For example, the microbubbles generated by the air injector 121 in the mixing and coagulation basin 110 that is a compartment preceding to the floc remover 122 stick to the flocs, thereby raising the flocs to the surface of the water. After that, the floating flocs are skimmed by a skimmer of the floc remover 122 and are then discharged out of the water treatment apparatus.

Figure 3:
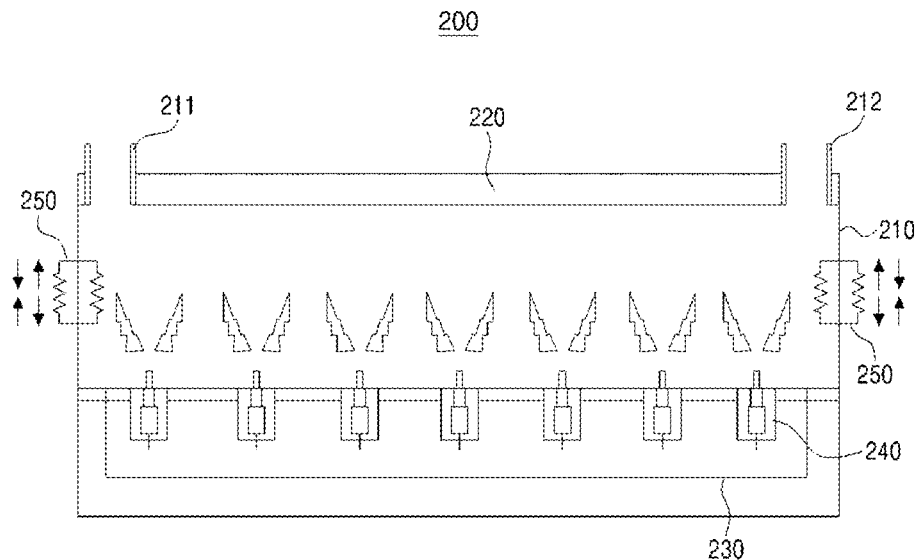
FIG. 3 is a schematic view illustrating an underwater plasma discharge module included in the water treatment apparatus according to an exemplary embodiment.

FIG. 3 is a conceptual diagram schematically illustrating the underwater plasma discharge module 200 included in the water treatment apparatus 10 according to an exemplary embodiment. Referring to FIG. 3, the underwater plasma discharge module 200 may include a reactor 210 including an input port 211 through which feed water flows in and an output portion 212 through which purified water flows out, a ground electrode 220 located at a first side of the reactor 210, and a plasma electrode module 230 located at a second side of the reactor 210 and configured to generate plasma.

The reactor 210 can contain water to be treated. While positions of the input port 211 and the output port 212 are not particularly limited, it is preferable that the input port 211, the output port 212, and the ground electrode 220 are located on a same side (e.g., the same side surface of the reactor 210 if the reactor 210 has a parallelepiped shape). A plasma electrode 240 may be disposed to face the ground electrode 220. In this case, a plate-shaped ground electrode 220 may serve as an upper plate of the reactor 210, and the input portion 211 and the output portion 212 are formed to pass through the ground electrode 220.

The reactor 210 may include a gap adjuster 250 that adjusts a gap between the ground electrode 220 and the plasma electrode 240 located in the plasma electrode module 230. The voltage applied to the plasma electrode 240 and the gap between the ground electrode 220 and the plasma electrode 240 may be adjusted according to a type or quality of water to be treated. The gap adjuster 250 includes components that are arranged to respectively face the first side surface and the second side surface of the reactor 210 to reduce or increase the height of the reactor, in which the first side surface and the second side surface are opposite to each other. In this way, the gap adjuster 250 controls the feed water storage capacity of the reactor 210 and the gap between the ground electrode 220 and the plasma electrode 240.

The ground electrode 220 is a commonly occurring electrode and is provided at one side (i.e., the first side) of the reactor 210. The ground electrode 220 has a plate shape and serves as one side surface of the reactor 210. The ground electrode 220 is in contact with feed water to be treated so that the feed water is grounded.

The plasma electrode 240 is connected to a power supply unit. The plasma electrode 240 operates when alternating current (AC), direct current (DC), or DC voltage is supplied from the power supply unit. The plasma electrode 240 may be provided at the second side of the reactor 210. The plasma electrode 240 may be an array of electrodes. The array of electrodes may be provided in a form of individual electrodes or in a form of a module (hereinafter, referred to as plasma electrode module 230). The plasma electrode module 230 may be disposed inside the reactor 210 and installed to face the ground electrode 220.

If the plasma electrode module 230 includes multiple plasma electrodes 240, the number of plasma electrodes constituting the plasma electrode module 230 is preferably in a range of 2 to 30. It is more preferably in a range of 8 to 20 and most preferably in a range of 12 to 18.

If the plasma electrode module 230 includes a smaller number of plasma electrodes than required, it is difficult to obtain sufficient water treatment efficiency. On the contrary, if the plasma electrode module includes a larger number of plasma electrodes than required, water quality is deteriorated due to a decrease in dissolved oxygen (DO) and cost effectiveness decreases due to the increase in power consumption.

In addition, the gap between each of the plasma electrodes 240 is preferably in a range of 1 cm to 8 cm, more preferably in a range of 2 cm to 6 cm, and most preferably in a range of 2 cm to 4 cm. If the gap is smaller or larger than required, that is, the gap is outside the range, the water treatment efficiency is lowered.

Figure 4:
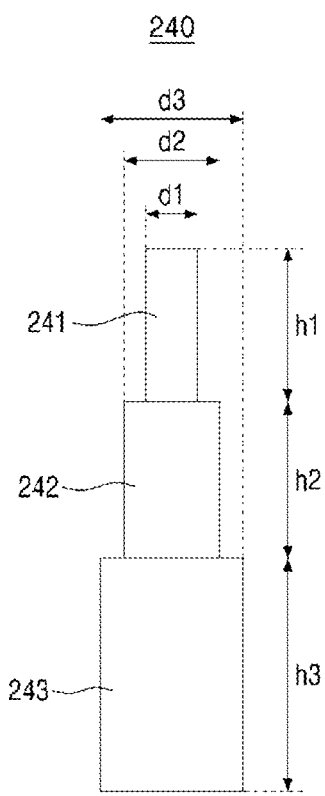
FIG. 4 is a diagram schematically illustrating a plasma electrode.

FIG. 4 is a diagram schematically illustrating the plasma electrode 240. Referring to FIG. 4, the plasma electrode 240 may have a multilayer structure in which a discharge portion 241 for generating plasma, a fixed portion 242, and a ground portion 243 in contact with a conductive substrate are stacked in this order. The plasma electrode 240 is a one-piece body. That is, the discharge portion 241, the fixed portion 242, and the ground portion 243 are integrally formed. Therefore, it is possible to prevent the plasma electrode 240 from being broken when the plasma electrode 240 is applied with a higher voltage than necessary. That is, the plasma electrode 240 has high durability and can be easily replaced if necessary.

The plasma electrode 240 is a one-piece body such that the elements of the plasma electrode 240 are made of the same material having corrosion resistance. Tungsten, tungsten alloy, stainless steel, or the like may be used as the material having corrosion resistance. It is preferable to use stainless steel as the material of the plasma electrode 240.

While a shape of the plasma electrode 240 is not particularly limited, it is preferable that the plasma electrode 240 has a columnar shape in terms of stable generation of plasma. For example, a diameter d1 of the discharge portion 241 positioned at a top may be the smallest, and a diameter d3 of the ground portion 243 positioned at a bottom may be the largest. Such an arrangement in which the diameter decreases toward the top is advantageous in terms of an insulation efficiency and a discharge efficiency of the plasma electrode 240.

In order to maximize the insulation efficiency and the discharge efficiency of the plasma electrode 240, a ratio of the diameters d1, d2, and d3 of the discharge portion 241, the fixed portion 242, and the ground portion 243 is preferably 1 to 2:8 to 10:12 to 16 (d1:d2:d3). On the other hand, a ratio of heights h1, h2, and h3 of the discharge portion 241, the fixed portion 242, and the ground portion 243 is preferably 1:1:1 to 2 (h1:h2:h3).

Preferably, the diameter d1 of the discharge portion 241 is greater than 1 mm and less than 4 mm. More preferably, it may be in a range of 2 mm to 3 mm. If the diameter d1 of the discharge portion 241 is 1 mm or less, the plasma is not sufficiently formed, resulting in low water treatment efficiency. If the diameter d1 of the discharge portion 241 is greater than 4 mm, the plasma is unevenly generated on the surface of the discharge portion 241, resulting in low water treatment efficiency.

Figure 5A:
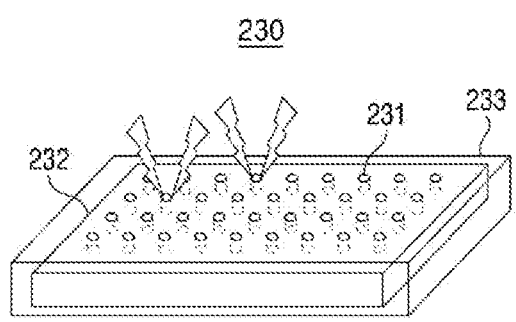
FIGS. 5A and 5B are diagrams illustrating a plasma electrode module according to an exemplary embodiment.
Figure 5B:
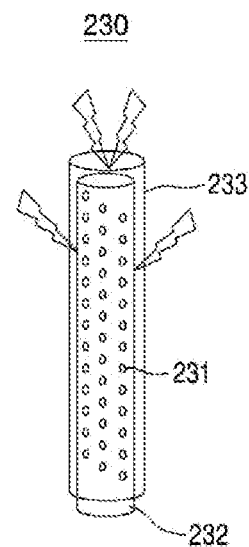

FIGS. 5A and 5B illustrate plasma electrode modules 230 according to exemplary embodiments. The plasma electrode module 230 may include a conductive substrate 232 having a plurality of holes 231 and a ceramic layer 233 surrounding a surface of the conductive substrate 232 except for a surface in each hole 231.

The plasma electrodes 240 are positioned in the respective holes 231. The plasma electrode module 230 may have a plate shape or a columnar shape as illustrated in FIGS. 5A and 5B depending on the shape of the conductive substrate 232. The shape of the plasma electrode module 230 may be determined depending on the shape of the reactor.

The conductive substrate 232 may be made of a material having high electrical conductivity and durability. For example, tungsten or tungsten alloy may be used.

It is understood that the type of the plasma electrode module 230 may not be limited to the example illustrated in FIGS. 3, 4, 5A, and 5B, and may be changed or vary according to one or more other exemplary embodiments. For example, multiple plasma electrode modules may be used. If multiple plasma electrode modules 230 are used, the plasma electrode modules 230 are connected in series, in parallel, or in combination of series connection and parallel connection.

The configuration in which the plasma electrode modules 230 are connected in series is suitable for purification of a small amount of highly polluted water, and the configuration in which the plasma electrode modules 230 are connected in parallel is suitable for purification of a large amount of less polluted water. The hybrid configuration including the plasma electrode modules connected in series and the plasma electrode modules connected in parallel can attain both of the effects.

Figure 6:
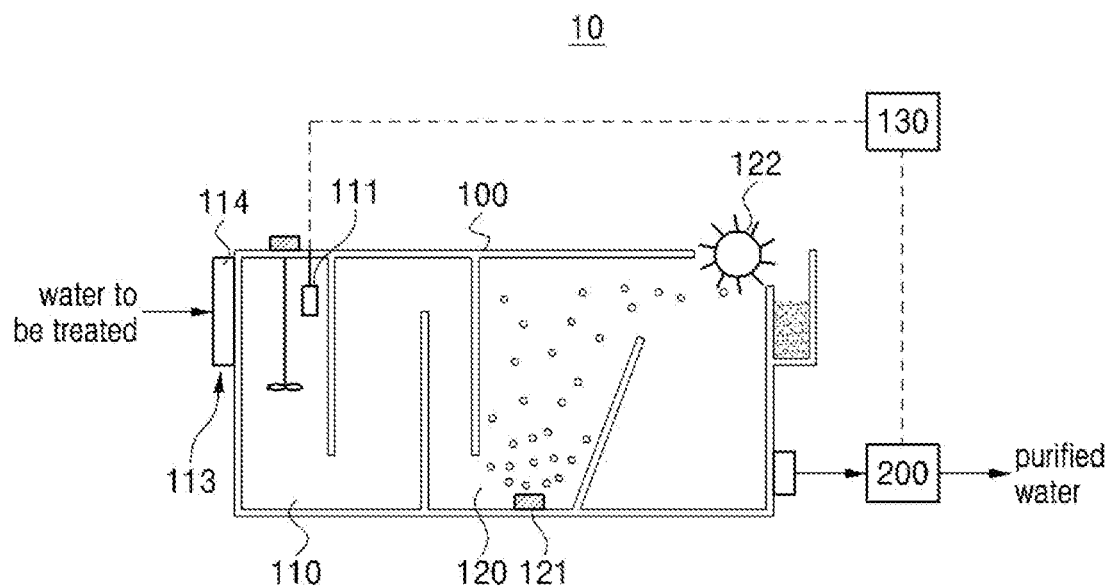
FIGS. 6 and 7 are schematic views illustrating a water treatment apparatus according to another exemplary embodiment.
Figure 7:
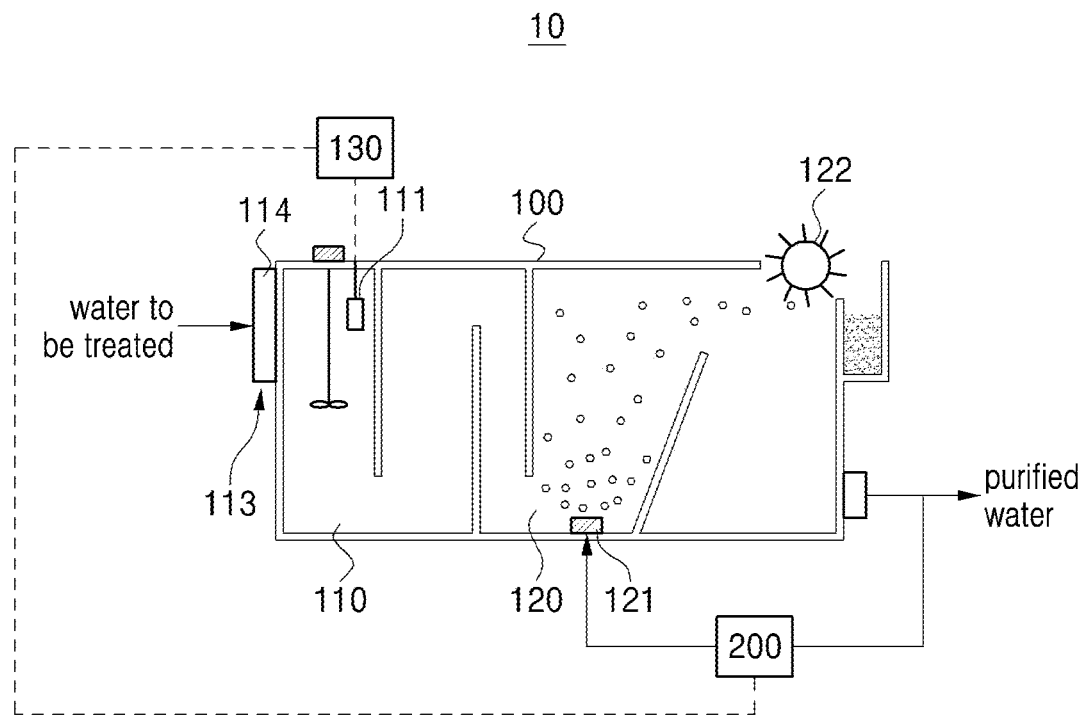

FIGS. 6 and 7 illustrate water treatment apparatuses 10 according to another exemplary embodiments. Referring to FIGS. 6 and 7, a water treatment apparatus 10 may include a dissolved air flotation device 100 that removes foreign matter contained in water to be treated and an underwater plasma discharge module 200 that is installed at a subsequent stage of the dissolved air flotation device 100 and generates underwater discharge plasma in a portion of the water discharged from the dissolved air flotation device 100.

Because the water treatment apparatus 10 is same as the water treatment apparatus 10 of FIGS. 1 and 5 except for a position of the underwater plasma discharge module 200, a redundant description will be omitted.

In the water treatment apparatus 10, the underwater plasma discharge module 200 is located at a next stage to the dissolved air floatation device 100, and the treated water discharged from the dissolved air floatation device 100 undergoes underwater plasma discharging. Therefore, organic substances and microorganisms remaining in the treated water discharged from the dissolved air flotation device 100 can be removed by the radicals generated through the underwater plasma discharging, resulting in improvement in water treatment efficiency.

Alternatively, as illustrated in FIG. 7, a portion of the treated water discharged from the dissolved air floatation device 100 may be subjected to underwater plasma discharging, and microbubbles may be supplied to the resulting water by a saturator. This bubble-added water may be used as a microbubble source for the flotation basin 120.

The process of subjecting a portion of the treated water to underwater plasma discharging and saturating the resulting water with air improves the effect of removing foreign matter and the floatation efficiency in the flotation basin 120 because the amount of microbubbles generated in a saturation basin in which the saturator is installed considerably increases.

As described above, the underwater plasma discharge module 200 is applied to the dissolved air flotation device 100 used for sewage or wastewater purification or seawater desalination to improve efficiency of removal or decomposition of foreign matter contained in water and to improve efficiency of formation of flocs in water. Therefore, it is possible to reduce the usage of chemicals for coagulation or flocculation and the cost for removal of the chemicals in the subsequent process.

In addition, the efficiency of floatation and removal of flocs in the flotation basin 120 of the dissolved air flotation device 100 is improved due to the microbubbles generated by the underwater plasma discharge module 200.

EXAMPLE 1

In order to evaluate discharge characteristics according to the diameter of the discharge portion 241 of the plasma electrode 240 used for water treatment, the plasma electrode 240 configured such that the ground portion 243, the fixed portion 242, and the discharge portion 241 are integrally formed as one-piece body is used to generate ozone ($O_3$), and an amount of generated ozone ($O_3$) was measured.

The lengths of the ground portion 243, the fixed portion 242, and the discharge portion 241 are set to 16 mm, 11 mm, and 11 mm, respectively. Next, electric current is supplied to the plasma electrode 240 while varying the diameter of the discharge portion 241 of the plasma electrode, and the concentration of ozone is measured each time the diameter of the discharge portion 241 is changed. Ozone is generated due to the plasma generated at the discharge portion 241 which is a top portion of the electrode. The concentration of ozone is an indicator of the amount of generated plasma and has a significant impact on decomposition of contaminants such as total organic carbon (TOC).

The diameter of the discharge portion 241 is changed from 1 mm to 4 mm, and the ratio of the diameters of the ground portion 243, the fixed portion 242, and the discharge portion 241 is maintained at 7.5:5:1. The concentration of ozone produced by applying the same voltage is shown in Table 1.

TABLE 1

|  | Diameter of Discharge Portion (mm) | | | |
| --- | --- | --- | --- | --- |
|  | 1 | 2 | 3 | 4 |
| Concentration of $O_3$ (ppm) | — | 0.06 | 0.07 | 0.0001 |

As shown in Table 1, if the diameter of the discharge portion 241 is not enough (i.e., 1 mm), the ozone is not detected because the plasma is not generated adequately. On the contrary, if the diameter is excessively large (i.e., 4 mm), because the plasma is not uniformly generated over the surface of the discharge portion 241, the amount of ozone generated is reduced in comparison with the case in which the diameter of the discharge portion is shorter.

EXAMPLE 2

The concentration of ozone, the removal rate of chlorophyll-a, a redox potential (ORP), and ultraviolet absorbance (UV254) are measured while varying the number of plasma electrodes 240 provided in the plasma electrode module 230. The results are plotted in FIGS. 8 and 9.

Figure 8:
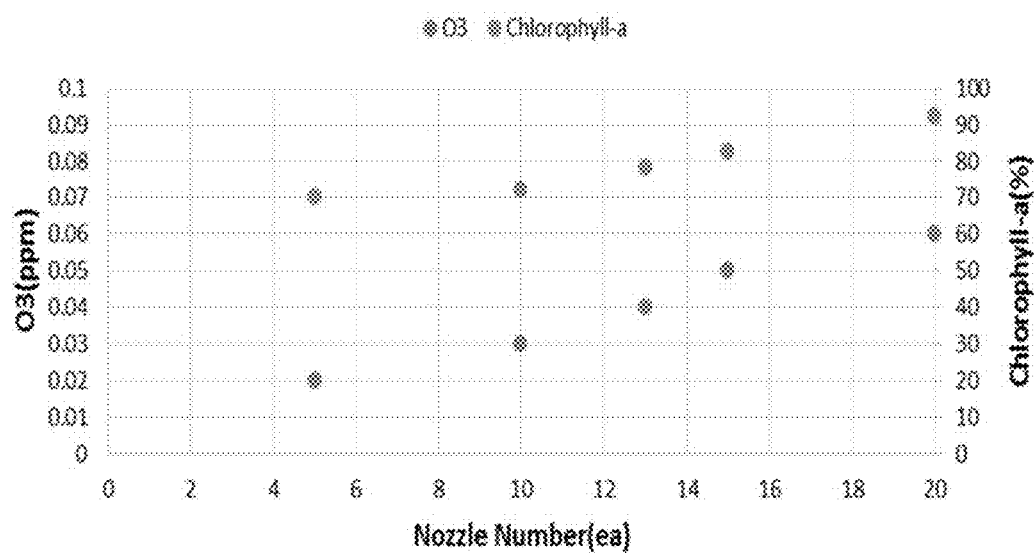
FIG. 8 is a graph showing changes in concentration of ozone and concentration of chlorophyll-a according to a number of electrodes.
Figure 9:
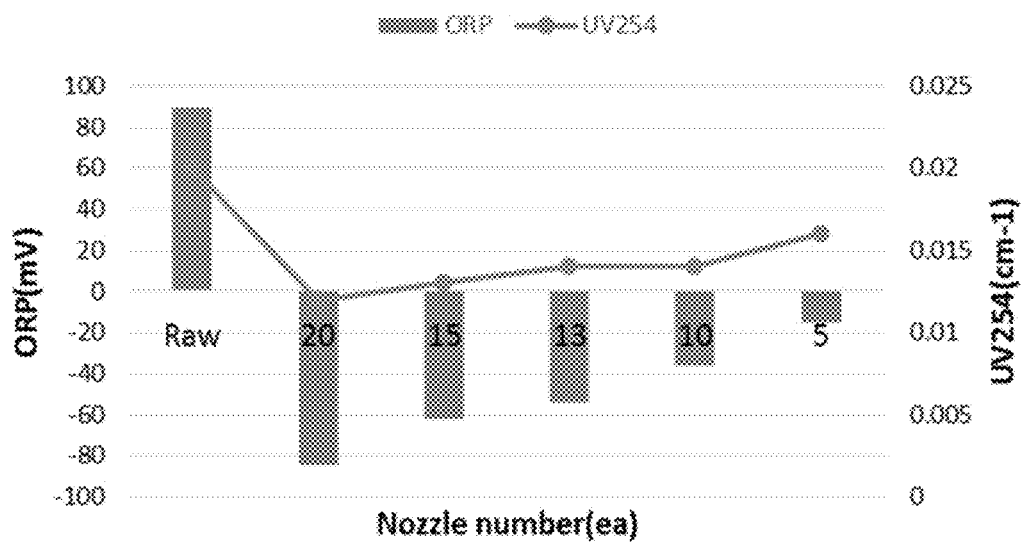
FIG. 9 is a graph illustrating changes in redox potential and ultraviolet absorbance according to a number of electrodes.

The results illustrated in FIGS. 8 and 9 show that as the number of plasma electrodes 240 increases, the ozone concentration and the chlorophyll-a removal rate increase and the ultraviolet absorbance and the redox potential decrease.

The concentration of ozone is an indicator of the amount of plasma generated by the plasma electrode module 230 and has a significant impact on the decomposition of contaminants such as TOC. That is, as the concentration of ozone increases, the concentration of contaminants decreases. The chlorophyll-a is an indicator of the concentration of algae. Therefore, the higher the chlorophyll-a removal rate, the better the water quality is. In addition, the ultraviolet absorbance, especially at a wavelength of 254 nm, is an indicator of the concentration of nondegradable aromatic organic substances. Therefore, the lower the absorbance is, the better the water quality is. On the other hand, because the redox potential is proportional to the dissolved oxygen (DO), the higher the redox potential is, the better the water quality is.

That is, the results illustrated in FIGS. 8 and 9 show that as the number of plasma electrodes 240 increases, the concentration of ozone increases, the algae removal rate and the aromatic organic substance removal rate increase, and the dissolved oxygen (DO) decreases.

Therefore, in order to improve both the ozone generation efficiency and the water treatment efficiency, the number of plasma electrodes 240 needs to appropriate. It is proved that the appropriate number of plasma electrodes 240 is preferably 2 to 30, more preferably 8 to 20, and most preferably 12 to 18 from the experimental results.

EXAMPLE 3

The concentration of ozone, the removal rate of chlorophyll-a, a redox potential (ORP), and ultraviolet absorbance (UV254) are measured while varying the gap between each of the plasma electrodes 240 used in the plasma electrode module 230. The results are plotted in FIGS. 10 and 11.

Figure 10:
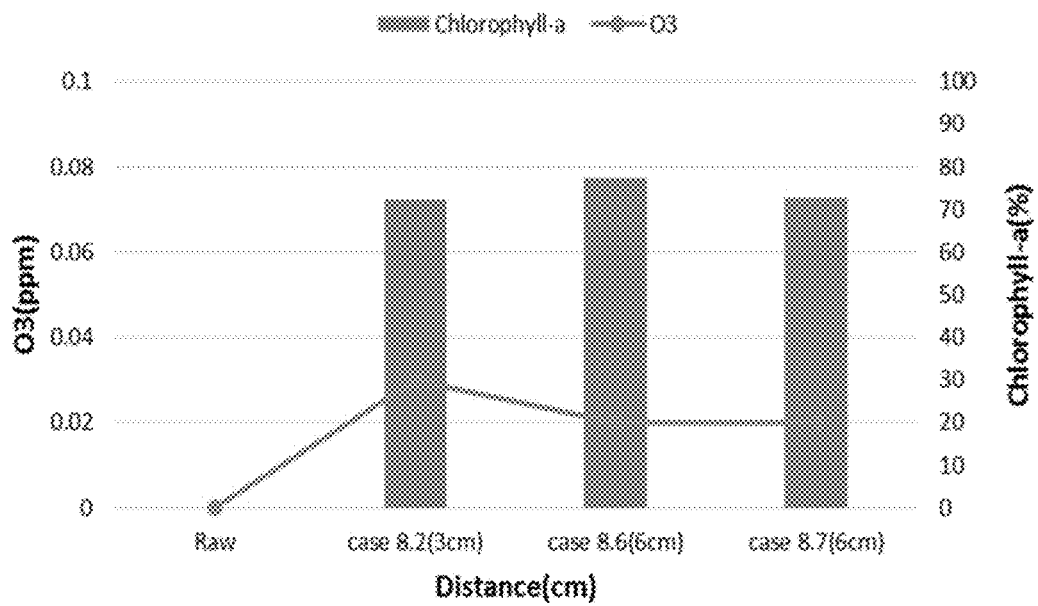
FIG. 10 is a graph illustrating changes in concentration of ozone and concentration of chlorophyll-a according to a gap between electrodes.
Figure 11:
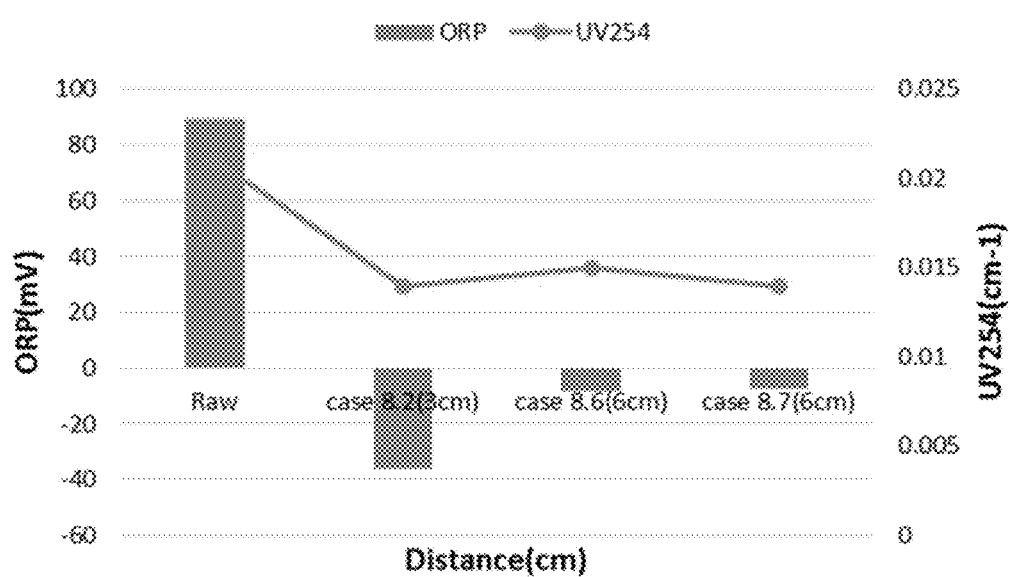
FIG. 11 is a graph illustrating changes in redox potential and ultraviolet absorbance according to a gap between electrodes.

The results illustrated in FIGS. 10 and 11 show that as the gap between each of the plasma electrodes 240 increases, the ozone concentration and the chlorophyll-a removal rate decrease, the dissolved oxygen increases, and the organic substance removal efficiency decreases.

From the experimental results, it is confirmed that the gap between each of the plasma electrodes 240 to obtain an adequate water treatment efficiency and to increase ozone generation is preferably 2 cm to 6 cm and more preferably 2 cm to 4 cm.

While exemplary embodiments have been described with reference to the accompanying drawings, it is to be understood by those skilled in the art that various modifications in form and details may be made therein without departing from the spirit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A water treatment apparatus comprising:
   a dissolved air flotation device configured to remove foreign matter contained in water, the dissolved air flotation device including:
      a mixing and coagulation basin configured to coagulate or flocculate the foreign matter contained in the water, to form and grow flocs of the foreign matter, and
      a flotation basin configured to raise and remove the flocs by supplying microbubbles to the water passing through the mixing and coagulation basin; and
   an underwater plasma discharge module disposed at a preceding stage of the dissolved air flotation device and configured to perform underwater plasma discharging with respect to a portion of the water to be introduced into the dissolved air flotation device, the underwater plasma discharge module including a reactor formed by
      a plasma electrode module that is configured to generate plasma and includes a continuous surface facing in a first direction of the underwater plasma discharging,
      a ground electrode having a continuous surface facing the continuous surface of the plasma electrode module,
      an input port formed in the continuous surface of the ground electrode, through which the water flows into the reactor in a second direction opposite to the first direction, and
      an output port formed in the continuous surface of the ground electrode, through which purified water flows out of the reactor in the first direction,
   wherein the reactor is configured to pass the water from the input port to the output port along a generally straight path between the continuous surfaces of the plasma electrode module and the ground electrode.

2. The water treatment apparatus according to claim 1, wherein the mixing and coagulation basin comprises a measuring unit configured to measure a concentration of the foreign matter contained in the water and a controller configured to control an operation of the underwater plasma discharge module according to a measurement value output from the measuring unit.

3. The water treatment apparatus according to claim 1, wherein the flotation basin comprises an air injector configured to raise the flocs contained in the water passing through the mixing and coagulation basin and a floc remover configured to remove the flocs floating on the water.

4. The water treatment apparatus according to claim 3, further comprising a filter configured to filter out the foreign matter remaining in the water passing through the floc remover.

5. The water treatment apparatus according to claim 1, wherein the reactor further comprises a gap adjuster configured to adjust a gap between the ground electrode and the plasma electrode module.

6. The water treatment apparatus according to claim 1, wherein the plasma electrode module comprises:
   a conductive substrate including a plurality of holes;
   a ceramic layer surrounding a surface of the conductive substrate except for a surface in each of the holes; and
   a plurality of plasma electrodes that are disposed in the plurality of holes of the conductive substrate, respectively, and has a multilayer structure including a ground portion, a fixed portion, and a discharge portion which are sequentially stacked, and
wherein the ground portion is in contact with the conductive substrate and the plasma is generated on the discharge portion.

7. The water treatment apparatus according to claim 6, wherein the ground portion, the fixed portion, and the discharge portion are integrally formed as a one-piece body and are made of a same material having corrosion resistance.

8. The water treatment apparatus according to claim 6, wherein the conductive substrate has a plate shape or a columnar shape.

9. A water treatment apparatus comprising:
   a dissolved air flotation device configured to remove foreign matter contained in water, the dissolved air flotation device including:
      a mixing and coagulation basin configured to coagulate or flocculate the foreign matter contained in the water, to form and grow flocs of the foreign matter, and a flotation basin configured to raise and remove the flocs by supplying microbubbles to the water passing through the mixing and coagulation basin; and an underwater plasma discharge module disposed at a subsequent stage of the dissolved air flotation device and configured to perform underwater plasma discharging with respect to at least a portion of the water to be discharged from the dissolved air flotation device, the underwater plasma discharge module including a reactor formed by a plasma electrode module that is configured to generate plasma and includes a continuous surface facing in a first direction of the underwater plasma discharging, a ground electrode having a continuous surface facing the continuous surface of the plasma electrode module, an input port formed in the continuous surface of the ground electrode, through which the water flows into the reactor in a second direction opposite to the first direction, and an output port formed in the continuous surface of the ground electrode, through which purified water flows out of the reactor in the first direction, wherein the reactor is configured to pass the water from the input port to the output port along a generally straight path between the continuous surfaces of the plasma electrode module and the ground electrode.

10. The water treatment apparatus according to claim 9, wherein the microbubbles are supplied into a portion of purified water resulting from the underwater plasma discharging performed by the underwater plasma discharge module, and the purified water in which the microbubbles are contained is used as a microbubble source for the flotation basin.

11. The water treatment apparatus according to claim 10, wherein the mixing and coagulation basin comprises a measuring unit configured to measure a concentration of the foreign matter contained in the water and a controller configured to control an operation of the underwater plasma discharge module according to a measurement value output from the measuring unit.

12. The water treatment apparatus according to claim 9, wherein the flotation basin comprises an air injector configured to raise the flocs to a surface of the water passing through the mixing and coagulation basin and a floc remover configured to remove the flocs floating on the surface of the water.

13. The water treatment apparatus according to claim 12, further comprising a filter configured to filter the foreign matter remaining in the water passing through the remover.

14. The water treatment apparatus according to claim 9, wherein the reactor further comprises a gap adjuster configured to adjust a gap between the ground electrode and the plasma electrode module.

15. The water treatment apparatus according to claim 9, wherein the plasma electrode module comprises:

a conductive substrate including a plurality of holes;

a ceramic layer surrounding a surface of the conductive substrate except for a surface in each of the holes; and a plurality of plasma electrodes that are disposed in the plurality of holes of the conductive substrate, respectively, each having a multilayer structure including a ground portion, a fixed portion, and a discharge portion which are sequentially stacked, and wherein the ground portion is in contact with the conductive substrate and the plasma is generated on the discharge portion.

16. The water treatment apparatus according to claim 15, wherein the ground portion, the fixed portion, and the discharge portion are integrally formed as a one-piece body and are made of a same material having corrosion resistance.

17. A water treatment apparatus comprising:

a dissolved air flotation device configured to remove foreign matter contained in water; and an underwater plasma discharge module configured to perform underwater plasma discharging, wherein the dissolved air flotation device comprises a mixing and coagulation basin configured to coagulate or flocculate the foreign matter contained in the water to form and grow flocs of the foreign matter, and a flotation basin configured to raise and remove the flocs by supplying microbubbles to the water passing through the mixing and coagulation basin, wherein the underwater plasma discharge module comprises:

a reactor including an input port through which the water flows in and an output port through which purified water flows out;

a ground electrode located in a first side of the reactor; and a plasma electrode module located in a second side of the reactor and configured to generate plasma, and wherein the plasma electrode module comprises:

a conductive substrate including a plurality of holes;

a ceramic layer surrounding a surface of the conductive substrate except for a surface in each of the holes; and plasma electrodes disposed in respective holes and having a multilayer structure including a ground portion, a fixed portion, and a discharge portion which are sequentially stacked, wherein the ground portion is in contact with the conductive substrate and the plasma is generated on the discharge portion.

18. The water treatment apparatus according to claim 17, wherein the underwater plasma discharge module is disposed at a preceding stage of the dissolved air flotation device and is configured to perform underwater plasma discharging with respect to a portion of the water to be introduced into the dissolved air flotation device.

19. The water treatment apparatus according to claim 17, wherein the underwater plasma discharge module disposed at a subsequent stage of the dissolved air flotation device and configured to perform underwater plasma discharging with respect to at least a portion of the water to be discharged from the dissolved air flotation device.

* * * * *